Aug. 27, 1957   N. B. WALES, JR   2,803,838
AIRCRAFT CRASH MARKING DEVICE
Filed Aug. 26, 1954

INVENTOR
NATHANIEL B. WALES, JR.

BY

ATTORNEYS

# United States Patent Office 2,803,838
Patented Aug. 27, 1957

2,803,838

AIRCRAFT CRASH MARKING DEVICE

Nathaniel B. Wales, Jr., Morristown, N. J., assignor, by mesne assignments, to the United States of America as represented by the Secretary of the Navy Application August 26, 1954, Serial No. 452,475

5 Claims. (Cl. 9—9)

This invention relates to an improved automatic aircraft crash marking device for marking the point at which an aircraft crashed in a body of water and submerged itself therein.

Generally, this device comprises a buoyant marker which is mounted on an aircraft so that an exposed portion thereof will be in actual contact with the water in the event of a sea crash landing. The device is constructed in such a manner that water pressure on said exposed portion will automatically cause the ejection of the buoyant marker from the aircraft. Water soluble plugs are placed in ports in the buoyant marker which has been ejected from the aircraft to permit the entry of sea water into a chamber after the plugs have dissolved and thus complete a circuit to a flashing beacon and to release a dye marker to aid rescuers in locating the submerged craft.

It is one object of this invention to provide a compact, light weight, inexpensive, and reliable crash marking buoy which is adapted to be automatically ejected from an aircraft making a forced landing at sea when the aircraft is submerged to a predetermined depth in water.

Another object of this invention is the provision of water soluble seals in ports provided in an aircraft crash marking buoy, so that after the buoy has been in water for a predetermined time, the seals dissolve and sea water is permitted to enter said device and complete an electric circuit to energize a flashing beacon which is mounted in said buoy.

Another object of this invention is the provision of water soluble seals in ports provided in an aircraft crash marking buoy so that after the buoy has been submerged for a predetermined time, the seals will dissolve and a fluorescein dye marker will be released from the buoy.

Figure 1:
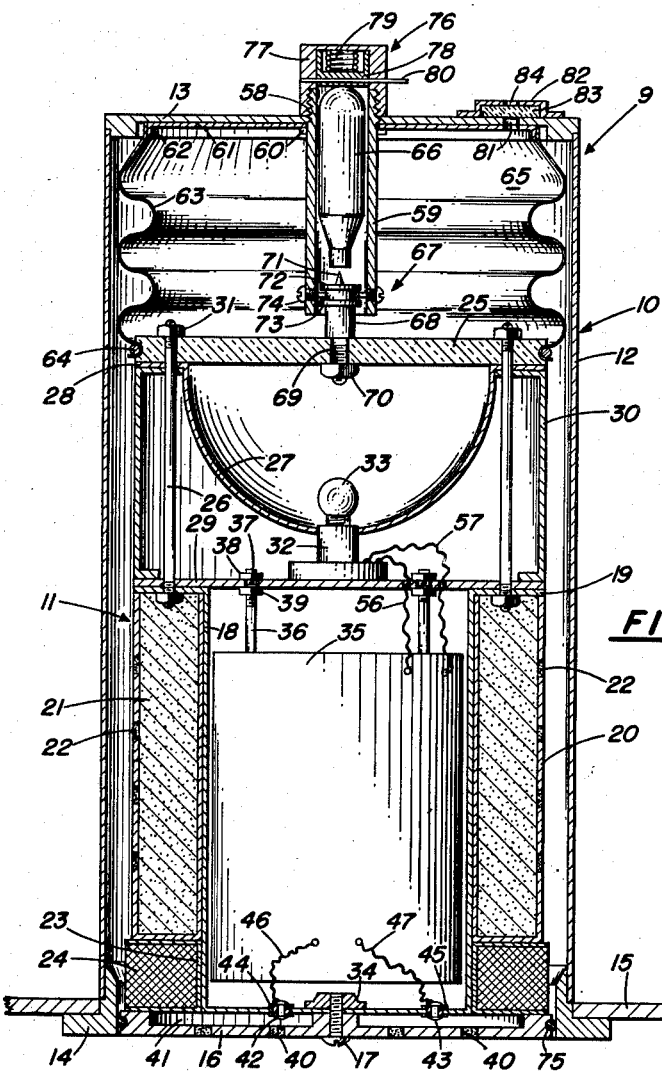
Figure 2:
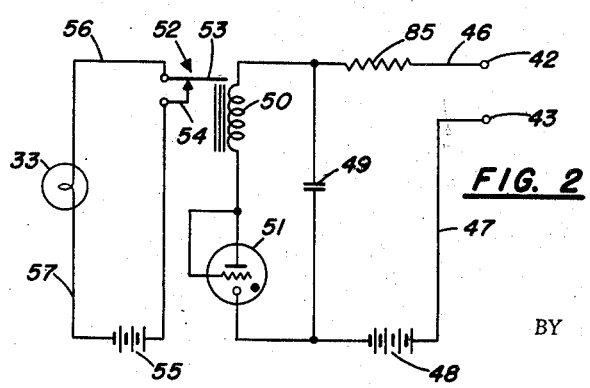

Other and more specific objects and advantages of this invention will become more readily apparent upon a careful consideration of the following detailed description and the annexed claims, taken in connection with the accompanying drawing in which:

Fig. 1 is a view, partially in cross section, of the preferred embodiment of this invention; and Fig. 2 is a wiring diagram for the beacon signaling device.

In Fig. 1 of the drawing, numeral 9 represents a crash marker assembly consisting of a container 10 which houses a crash marking buoy which is generally designated by numeral 11. Container 10 consists of a cylindrical sleeve portion 12 which has end plate 13 affixed to one end thereof in any suitable manner for the purpose of sealing that respective end. A circular flanged ring 14 is suitably affixed to the end of sleeve 12 which is remote from the end which has end plate 13 affixed thereto. The container 10, in use, is inserted into a hole which is cut in the skin 15 of an aircraft, and the flanged ring 14 is suitably attached to the skin 15 of the aircraft. When the crash marker buoy container 10 is positioned in operative relationship in the aircraft, only the flanged portion of ring 14 protrudes into the airstream and the remainder of the container is positioned within the body of the aircraft.

The crash marker buoy assembly 9 consists of two main parts. The first is a mechanism for ejecting the crash marker buoy 11 from the assembly 9 when the aircraft upon which container 10 is mounted is submerged to a predetermined depth in a body of water. The second part is the crash marker buoy 11 itself. In order to facilitate the description of the various parts of this invention, the structure of the crash marker buoy 11 will be described first. The apparatus for ejecting the crash marker buoy 11 from the container 10 will be described afterwards.

The crash marker buoy 11 consists of a base plate 16 which has affixed thereto, as by bolt 17 and nut 34, a central cylindrical container 18. The end of container 18 which is remote from the end which is affixed to base plate 16 has an outwardly extending flange 19 formed thereon. Surrounding the central container 18, and positioned intermediate flange 19 and base 16, are hollow shell 20 and spool 23 which are adapted to be positioned concentrically with respect to central cylindrical container 18. Hollow shell 20 has an open end which is adapted to abut the underside of flange 19 and form a watertight connection therewith. Although not shown, a suitable gasket may be used to insure that this joint is watertight. The shell 20 holds a supply of fluorescein dye marker 21. The outer wall of shell 20 has holes therein which are filled with water soluble plugs 22. When the crash marker 11 is ejected from the aircraft into a body of water the plugs 22 will dissolve and the fluorescein dye marker 21 will be released. Spool 23 has a supply of line 24 wound thereon. One end of the line 24 is attached to the container 10 and the other end of the crash marker buoy 11 so that after the buoy 11 is ejected from the aircraft the buoy will be held in the proximate area of the submerged aircraft.

Affixed in spaced relationship to the side of flange 19, of central chamber 18, which is remote from the side which is in contact with the shell 20, is part of the flashing beacon assembly of crash marker buoy 11. A transparent member 25 has holes drilled therein (not numbered) through which bolts 26 are adapted to fit. A reflector 27, which has flanges 28 formed at the aperture plane thereof, is adapted to fit in proximate relationship to the transparent member 25. In assembled relationship, bolts 26 extend from the underside of flange 19 through holes (not numbered) in a platform 29, through holes (not numbered) in a spacing flange 30, through holes (not numbered) in the rim 28 of the reflector 27, and through holes (not numbered) in the transparent member 25. Nuts 31 thread on to bolts 26 and draw the aforedescribed portion of the flashing beacon assembly into fixed assembled relationship with the flanges 19 of container 18. Although not shown, gaskets may be inserted between the joints of the aforementioned members to make the assembly watertight. Mounted upon platform 29 is a light bulb socket 32 in which light bulb 33 is positioned. As can be seen from the drawing, the light bulb socket protrudes through an opening (not numbered) in the reflector 27. The center of gravity of the crash marker buoy 11 is positioned so that, after ejection into a body of water, the buoy will float with the transparent member 25 facing upward. Because of this, the light emitted by bulb 33 will be able to be seen.

The apparatus for causing operation of the light bulb 33, so that it acts as a flashing beacon will now be described. Positioned within container 18 is a container 35 which houses the electrical equipment necessary to cause the flashing beacon to operate. Container 35 has bolts 36 rigidly affixed thereto, which have a threaded end 37 protruding through holes (not numbered) in platform 29, Nuts 38 and 39 thread on end 37 of bolts 36, and securely fasten container 35 within container 18. The electrical equipment which is placed within container 35 is packed to insure a minimum of shifting, in a manner not shown. Base plate 16 has holes therein which are filled with water soluble plugs 40. After the ejection of buoy 11 from the aircraft, the sea water will dissolve plugs 40, enter the chamber 41, and serve to complete the circuit between electrodes 42 and 43, Figs. 1 and 2, which are mounted in the bottom of container 18 and insulated therefrom by grommets 44 and 45, respectively. Wires 46 and 47 lead into container 35 from electrodes 42 and 43, respectively.

Attention is now directed to Fig. 2 for a description of the electrical apparatus which is contained within container 35, but not shown in Fig. 1 for the sake of clarity. Connected in series with electrodes 42 and 43 is battery 48, condenser 49, and resistor 85. Connected in series across condenser 49 is relay coil 50 and cold cathode gas triode 51. When sea water comes in contact with electrodes 42 and 43, in the manner described above, these electrodes are effectively connected and the aforedescribed circuit is completed. The condenser 49 is charged by battery 48. When the charge on condenser 49 exceeds the point of breakdown of gas triode 51, the condenser 49 discharges through the triode and relay coil 50, and current will flow through coil 50 until the charge on condenser 49 decreases below the point of cut-off of triode 51. At this time current ceases to flow through relay coil 50. This cycle is repeated at a rate which depends on the quantitative values of the circuit components. Positioned in operative relationship with relay coil 50 is switch 52 consisting of contacts 53 and 54. When current flows through relay coil 50, the switch 52 closes and thereby completes a circuit between battery 55 and light bulb 33. Wires 56 and 57 lead from the switch 52 and battery 55, respectively, to bulb 33, Figs. 1 and 2.

According to the aforedescribed structure and mode of operation of crash marker buiy 11, it can be readily seen that light bulb 33 will flash periodically to provide a flashing beacon after soluble plugs 40 have been dissolved, and that fluorescein dye marker 21 is released from buoy 11 after soluble plugs 22 have been dissolved.

The structure and mode of operation of the ejection mechanism which ejects crash marker buoy 11 from container 10, after an aircraft has been submerged to a predetermined depth in water, will now be described. End plate 13, which is affixed to cylindrical sleeve portion 12 of container 10, has a tapped hole 58 centrally located therein. Adapted to be threaded into hole 58 is hollow cylindrical sleeve 59 which has threads (not numbered) formed at one end thereof and a collar 60 formed integrally with sleeve 59 where the aforementioned threads end. Collar 60 serves the function of holding plate 61 up against end plate 13 when sleeve 59 is threaded into hole 58, as shown in Fig. 1. Plate 61 has a flanged periphery 62 to which a flexible, substantially cylindrical membrane 63 is adapted to be attached so that an airtight seal is formed between flange 62 and membrane 63. The other end of membrane 63 is affixed by means of a resilient fastening ring 64 to the periphery of the transparent member 25 to provide an airtight seal between the two last mentioned members. It can thus be seen that an airtight chamber 65 is provided within the flexible membrane 63, the function of which will be discussed hereafter.

Adapted to be inserted within sleeve 59 is a cartridge of compressed gas 66. Fitted into one end of sleeve 59 is a piercing mechanism, generally designated by the numeral 67, for releasing the compressed gas from the cartridge. The piercing mechanism consists of a pin 68 having one end which is a threaded portion of reduced diameter 69 which fits through a hole (not numbered) in transparent member 25 and is fixedly secured thereto by nut 70. The other end of pin 68 is sharpened to a point 71 which is for piercing the seal of cartridge 66 when it comes in contact therewith in order to release the gas in said cartridge. The central portion of pin 68 consists of collars 72 and 73. Adapted to be threaded into sleeve 59 are shear pins 74, the ends of which fit between collars 72 and 73. It can thus be seen that pin 68 is rigidly affixed to both the marker buoy 11 and to cylindrical sleeve 59. It will be noted at this point that a gasket 75 is interposed between the base plate 16 of buoy 11 and the inside surface of fltnged ring 14 which is affixed to container 10. The function of this gasket is to make the space between the outside of crash marker buoy 11 and the inside of cylindrical sleeve 12 watertight.

The ejection mechanism operates in the following manner. After the aircraft submerges to a predetermined depth of water, water pressure against base plate 16, which is greater than the air pressure which exists in chamber 65, will cause the marker buoy 11 to move axially into container 10. Pin 68 of piercing mechanism 67, which is rigidly attached to marker buoy 11 moves along with buoy 11 when the water pressure on base 16 is sufficiently great to cause shearing of the pins 74 which tend to hold the piercing point 71 stationary with respect to cylindrical sleeve 59. The cartridge of compressed gas 66 is held against axial movement in a direction away from point 71 by a cap mechanism generally designated by numeral 76. After cartridge 66 is pierced, the gas released therefrom will escape into the air tight chamber 65 which is defined by flexible membrane 63, plate 61, and transparent member 25. The gas pressure within chamber 65 is now greater than the water pressure against base plate 16, and the marker buoy 11 will be forced out of the container 10 by the pressure within chamber 65. The membrane 63 is sufficiently long to allow the air which is released within chamber 65 to cause the marker buoy 11 to be fully ejected from container 11. When the limit of movement of marker buoy 11 has been reached, as governed by the length of flexible membrane 63, the air pressure within chamber 65 will cause the marker buoy 11 to continue its movement and separation between buoy 11 and membrane 63 will be obtained because resilient fastening ring 64 stretches and allows separation of buoy 11 from membrane 63. Since the buoy 11 is buoyant it then floats to the surface of the water, and after a predetermined time has elapsed, releases dye marker 21 and provides a flashing beacon in the manner fully described above.

The cap mechanism 76, which holds the cylinder of compressed gas 66 against axial movement away from piercing point 71, also has manual releasing means incorporated therein for ejecting buoy 11 from container 10, if this type of operation is desired. Hollow cup shaped cap 77 is internally threaded, as shown, and is adapted to mate with the externally threaded portion of cylindrical sleeve 59. It will be noted that mounted within the unthreaded internal surface of cap 77 is a piston 78 which can move from the inside of cap 77 into the inside of sleeve 59 when the cap and sleeve are assembled. Spring 79 is compressed between cap 77 and piston 78, and the cap and piston are maintained in a position with the compressed spring 79 between them by a pin 80 which extends through aligned apertures (not numbered) in cap 77 and piston 78. Pin 80 can be manually removed from cap 77, and when this is done, the compressed spring 79 will cause piston 78 to move away from the end of cap 77 and push the compressed gas cylinder 66 against point 71 whereby the compressed gas will be released from the cartridge 66. The shear pins 74 will be severed and the ejection of the crash marker buoy 11 will then be accomplished by the filling of chamber 65 with compressed air in the manner fully described above.

Because of the fact that the aircraft is subject to different atmospheric pressures at different altitudes, which might cause undesirable movement and possible premature release of the crash marker buoy, it is desirable to provide means which will slowly allow equalization of the air pressure in chamber 65 with that of the atmosphere. A breather port 81 is provided which extends through aligned openings in plate 61 and end plate 13. Affixed to end plate 13 is a casing 82 which houses a ceramic breather 83. Aperture 84 is provided in casing 82 to expose breather 83 to the atmosphere. The ceramic breather 83 allows air to slowly pass through it in order to equalize the air pressure within chamber 65 with that of the atmosphere in order to prevent undesired ejection of buoy 11. However, when the container 10 is rapidly submerged, the relatively high rate of change of the water pressure on base plate 16 of the buoy 11 will cause ejection of the buoy 11 in the manner described above since there will not be equalization of pressure between chamber 65 and the atmosphere. This is because the ceramic breather will not allow any substantial amount of water to pass through it to cause the pressure within chamber 65 to equalize itself with that on the base 16.

Obviously many modifications and variations of the present invention are possible in the light of the above teachings. It is therefore to be understood that within the scope of the appended claims the invention may be practiced otherwise than as specifically described.

Having thus described my invention I claim:

1. A crash marker device for marking the area in which an aircraft has submerged itself in a body of water comprising a container adapted to be mounted on an aircraft, a crash marker buoy positioned for relative movement within said container, said crash marker buoy providing a closure for one end of said container, means forming a chamber between said buoy and the other end of said container, a sealed cartridge of compressed gas positioned within said chamber, means responsive to the pressure exerted by the body of water on the portion of said crash marker buoy which forms a closure for one end of said container, when said container is submerged to a predetermined depth in said body of water, to cause said sealed cartridge of compressed gas to discharge into said chamber and thereby provide pneumatic pressure to eject said crash marker buoy from said container, and air breather means linking said chamber to the atmosphere to allow equalization of the air pressure between said chamber and the atmosphere to prevent premature ejection of said crash marker buoy from said container.

2. A crash marker buoy for marking the area in which an aircraft has submerged itself in a body of water comprising, a container having an open end and a closed end mounted in the body of an aircraft, a crash marker buoy slidably mounted in said container, a base plate fixed to the end of said buoy adjacent the open end of said container and having sealing engagement with said container, means forming a chamber between the closed end of said container and said buoy, a sealed cartridge of compressed gas mounted within said chamber, piercing means mounted on said buoy and within said chamber for releasing the gas from said cartridge into said chamber, shearable means for maintaining said piercing means in spaced relation with said cartridge until the pressure of said water against the base plate reaches a predetermined value to shear said shearable means, said buoy being ejected from said container by said gas when the gas is released from the cartridge, and restricted air breather means linking said chamber to the atmosphere to maintain equalization of air pressure within the chamber with that of the surrounding atmosphere to prevent premature ejection of the buoy.

3. A crash marker buoy for marking the area in which an aircraft has submerged in a body of water comprising, a container having an open end and a closed end mounted in the body of an aircraft, a crash marker buoy slidably mounted in said container, a base plate fixed to the end of said buoy adjacent the open end of said container and having sealing engagement with said container, an expansible bellows forming a chamber between the closed end of said container and said buoy, said bellows being fixed in the closed end of said container and releasably secured to said buoy, a sealed cartridge of compressed gas mounted within said chamber, piercing means mounted on said buoy and within said chamber for releasing the gas from said cartridge into the chamber, shearable means for maintaining said piercing means in spaced relation with said cartridge until the pressure of said water against the base plate reaches a predetermined value to shear said shearable means, said buoy being released from said bellows and ejected from said container by said gas when the gas is released from the cartridge, and restricted air breather means linking said chamber to the atmosphere to maintain equalization of air pressure within the chamber with that of the surrounding atmosphere to prevent premature ejection of said buoy.

4. In combination, a submersible object and a crash marker device for marking the area in which said object has submerged itself in a body of water comprising, a container having an open end and fixed to said object, a crash marker buoy slidably mounted in said container, a base plate fixed to said buoy and having sealing engagement with said container at its open end, means for attaching said buoy to said container, means in said container for ejecting and detaching said buoy from said container, and means secured to said buoy and in operative relationship with said ejecting means for causing said ejecting means to eject and detach said buoy from said container in response to movement of said buoy when water pressure acts on said plate.

5. In combination, a submersible object and a crash marker device for marking the area in which said object has submerged itself in a body of water comprising, a container having an open end and fixed to said object, a crash marker buoy slidably mounted in said container, a base plate fixed to said buoy and having sealing engagement with said container at its open end, means for attaching said buoy to said container, means forming a chamber between said buoy and the closed end of said container, a sealed cartridge of compressed gas within said chamber, means secured to said buoy and in operative relationship with said cartridge for causing said cartridge to discharge the compressed gas into said chamber and eject and detach said buoy from said container in response to movement of said buoy when water pressure acts on said plate.

References Cited in the file of this patent

UNITED STATES PATENTS

| 357,056 | Weil | Feb. 1, 1887 |
| 2,090,619 | Biach | Aug. 24, 1937 |
| 2,192,450 | Miller | Mar. 5, 1940 |
| 2,380,587 | Fenton | July 31, 1945 |
| 2,402,143 | Arenstein | June 18, 1946 |
| 2,459,267 | Dwyer | Jan. 18, 1949 |
| 2,674,726 | Williams | Apr. 6, 1954 |
| 2,687,541 | Bannister | Aug. 31, 1954 |

FOREIGN PATENTS

| 632,429 | France | Oct. 4, 1927 |